UNITED STATES PATENT OFFICE.

WALTER BAUER, OF DARMSTADT, HESSIA, GERMANY, ASSIGNOR TO THE FIRM RÖHM & HAAS, OF DARMSTADT, HESSIA, GERMANY.

MANUFACTURE OF ALKYLENE CYANHYDRINS.

1,388,016. Specification of Letters Patent. Patented Aug. 16, 1921.

No Drawing. Application filed November 11, 1920. Serial No. 423,465.

*To all whom it may concern:*

Be it known that I, WALTER BAUER, a citizen of the Free State of Schwarzburg-Sondershausen, in the German Republic, residing at Darmstadt, in the Free State of Hessia, Germany, have invented Improvements in the Manufacture of Alkylene Cyanhydrins, for which I have filed applications in Germany, Sept. 3, 1919; in Great Britain, Sept. 1, 1920; Switzerland, Sept. 2, 1920; Norway, Sept. 3, 1920; and I do hereby declare the following to be a full, clear, and exact description of the same.

As is known, alkylene cyanhydrins are prepared by heating alkylene chlorhydrins for several hours with potassium cyanid in alcoholic-aqueous solution (*Ann.* 191, p. 268, 1878). "Since the yield was very unsatisfactory," Erlenmeyer devised a new process (*Ann.* 191, p. 269, 1878) for preparing alkylene cyanhydrins from alkylene oxid and hydrocyanic acid. This process, however, was quite unsatisfactory, by reason of its tedious and expensive character, and consequently the old process was reverted to (*Bull. Soc. Chim.* (3), vol. 9, p. 426, 1893), and this is still in use (*Jour. Am. Chem. Soc.* 39, 1917 p. 1465–1466) "The preparation of beta chloro and beta-brompropionic acids. By Walter A. Jacobs and Michael Heidelberger. Received May 5, 1917." (Contribution from the laboratories of the Rockefeller Institute for Medical Research.)

It has now been ascertained that alkylene halogenhydrins will react with purely aqueous cyanid solution, even in the cold, with formation of alkylene cyanhydrins. The employment of alcohol is therefore quite unnecessary; and the prolonged heating—which would have a directly unfavorable influence in this case—is dispensed with entirely. It is sufficient to mix the concentrated aqueous solution of cyanid thoroughly with the halogenhydrin—which is mostly only soluble with difficulty therein—and to insure, by cooling, that the reaction, which soon commences spontaneously, does not exceed a certain definite maximum temperature in each case. The temperature must remain below the point at which the corresponding cyanhydrin would be decomposed. If cooling be omitted the reaction proceeds in a very violent manner, and the yield falls to a fraction of the theoretical quantity. On the other hand the yield of the cyanhydrins is very good, and much better than could be obtained with the methods hitherto in use. This fact, combined with the saving in alcohol in the process, enables the alkylene cyanhydrins to be extensively applied in the preparation of technically valuable products. The cyanhydrins are isolated from their aqueous solution in the usual way.

Example I: A concentrated aqueous solution of 17 kilos. of potassium cyanid is gradually stirred into 30 kilos. of ethylene bromhydrin. A considerable amount of heat is disengaged, and potassium bromid is deposited. The temperature is kept down to 55–60 deg. by cooling with water. The ethylene cyanhydrin formed is washed with ether and fractionated. Yield, 85–95%.

Example II: 49 kgs. of sodium cyanid are added at usual temperature to a mixture of 80 kgs. of ethylene chlorhydrin and 20 kgs. of water and well stirred. The heating which occurs is by means of cooling preferably maintained at about 45° C. The sodium cyanid is solved while the sodium chlorid separates out. After 24 hours standing is separated of the deposit and the ethylene cyanhydrin is ethered and distilled. Output: 85% of the theory.

Having now described and ascertained the nature of my invention and in which the same is to be performed I now declare what I claim and desire to secure by Letters Patent of the United States:

1. The process for the manufacture of alkylcyanhydrins from alkylenehalogenhydrins and a solution of cyanid, characterized thereby that the change takes place in a pure water solution under the influence of cooling.

2. The process of preparing ethylenecyanhydrin which comprises causing a re-action between ethylenebromhydrin and potassium cyanid dissolved in water at a temperature of 55° to 60° C.

In testimony whereof, I have signed my name to this specification in the presence of two subscribing witnesses.

WALTER BAUER.

Witnesses:
 Dr. EUGEN LETROHE,
 HUGO WAY.